(12) United States Patent
Wei

(10) Patent No.: US 7,165,739 B2
(45) Date of Patent: Jan. 23, 2007

(54) WINDING DEVICE OF WINDING WHEEL AND WIRE

(76) Inventor: Jose Wei, No. 17-2, Pai Ling 1st Rd., Hsin Tien City, Taipei Hsien (TW)

( * ) Notice: Subject to any disclaimer, the term of this patent is extended or adjusted under 35 U.S.C. 154(b) by 0 days.

(21) Appl. No.: 10/673,585

(22) Filed: Sep. 30, 2003

(65) Prior Publication Data
US 2005/0006517 A1    Jan. 13, 2005

(30) Foreign Application Priority Data
Jul. 11, 2003   (TW) ............................... 92212765 U

(51) Int. Cl.
*B65H 75/48* (2006.01)
(52) U.S. Cl. .................................. 242/378.1
(58) Field of Classification Search ............ 242/378.1, 242/378.2, 378.3, 378.4, 378, 388.1, 388.2, 242/388.3, 388.4, 388.5
See application file for complete search history.

(56) References Cited

U.S. PATENT DOCUMENTS 6,474,585 B1 * 11/2002 Liao ........................ 242/378.1

6,834,820 B1 * 12/2004 Wei ............................ 242/378

* cited by examiner

*Primary Examiner*—John Q. Nguyen
(74) *Attorney, Agent, or Firm*—Lowe Hauptman & Berner, LLP

(57) ABSTRACT

A winding device of a winding wheel and a wire includes an elastically rotatable turning wheel having a flexibly connected fixed shaft, wheel breadths defining a left wheel breadth and a right wheel breadth, and a continuous wire defining left and right wires. A number of rounds of the left wire winded at the left wheel breadth is at least one more than that of the right wire winded at the right wheel breadth, such that when the left and right wires are released from the left and right wheel breadths to reach outer dead centers thereof, at least one round of basic coil of the left wire still tightly binds around the left wheel breadth and remains unreleased. The wire (signal wire) is prevented from damages and displacements resulted from shear force between the wire and wedge apertures at the wheel breadths when repeatedly withdrawn and pulled thereof.

2 Claims, 8 Drawing Sheets

WINDING DEVICE OF WINDING WHEEL AND WIRE

BACKGROUND OF THE INVENTION (a) Field of the Invention

The invention relates to a winding device of a winding wheel and a wire (signal wire) and more particularly, to a winding device, wherein when two ends of a signal wire are pulled out from surfaces of a turning wheel thereof by pulling force, shear force at connecting portions of the signal wire and the wheel surface does not result, thereby preventing damage to wire surfaces or conductive wires by eliminating stiff friction between the signal wire and the connecting portions.

(b) Description of the Prior Art

FIG. 6 shows a typical winding device, "USB Transmission Cable having Cable Winding Mechanism" disclosed by Taiwan Patent Publication No. 529819, the invention comprises an rotatable turning wheel A flexibly connected to a fixed shaft B, and a spring C having an inner end thereof fastened to the fixed shaft B and an outer end thereof fastened to a wall surface of the rotatable turning wheel A. The turning wheel A has an encircling groove A1 at inner walls thereof, and two wedge apertures A2 and A3 at a wheel surface thereof. A continuous signal wire W has a middle section thereof placed in the groove A1, and left and right wires WI and W2 thereof stretched out via the wedge apertures A2 and A3 and are wound on an outer wheel surface of the turning wheel A in reverse 5 directions. When the left and right wires WI and W2 are extracted, the turning wheel A is rotated relative to the fixed shaft B as a center of rotation thereof, with the left and right wires W1 and W2 being pulled out by the same lengths. However, wires that are pulled using such method in the long run are prone to the following drawbacks:

1. Referring to FIGS. 7 and 8, when the left wire W1 (or the right wire W2) is fully pulled out due to friction (shear force) at edges of the wedge apertures A2 and A3, contact portions A5 and A6 of the left and right wires W1 and W2 and end portions of the wedge apertures A2 and A3 are abraded and worn. In the long run, the left and right wires WI and W2 may be broken in conducting copper wires thereof, hence leading to poor contact.

2. Referring to FIG. 7, if excessive force is applied by a user at an end of the left wire W (or the right wire W2), the signal wire W may be displaced toward a direction within the encircling groove A1. Consequently, a released length of the left wire WI (or the right wire W2) is greater than that of the right wire W2 (or the left wire WI). When withdrawing to store the wire, an extra length of the left wire WI (or the right wire W2) remains behind and cannot be 5 effectively stored back on the wheel surface.

In the view of the aforesaid drawbacks, it is a vital task of the invention as how to prevent damages or displacements of the fixed ends of the turning wheel and the wires due to pulling force when the wires are released from the turning wheel.

SUMMARY OF THE INVENTION

Therefore, a primary object of the invention is to provide a winding device of a winding wheel and a wire (signal wire), wherein when the wire is repeatedly withdrawn and pulled out from a rotatable winding wheel, the wire is prevented from damages and displacements resulted from stiff friction between the wire and wedge apertures at wheel surfaces.

DETAILED DESCRIPTION OF THE PREFERRED EMBODIMENTS

To better understand the aforesaid objects, effects accomplished by the invention shall be given with the accompanying drawings.

Figure 1:
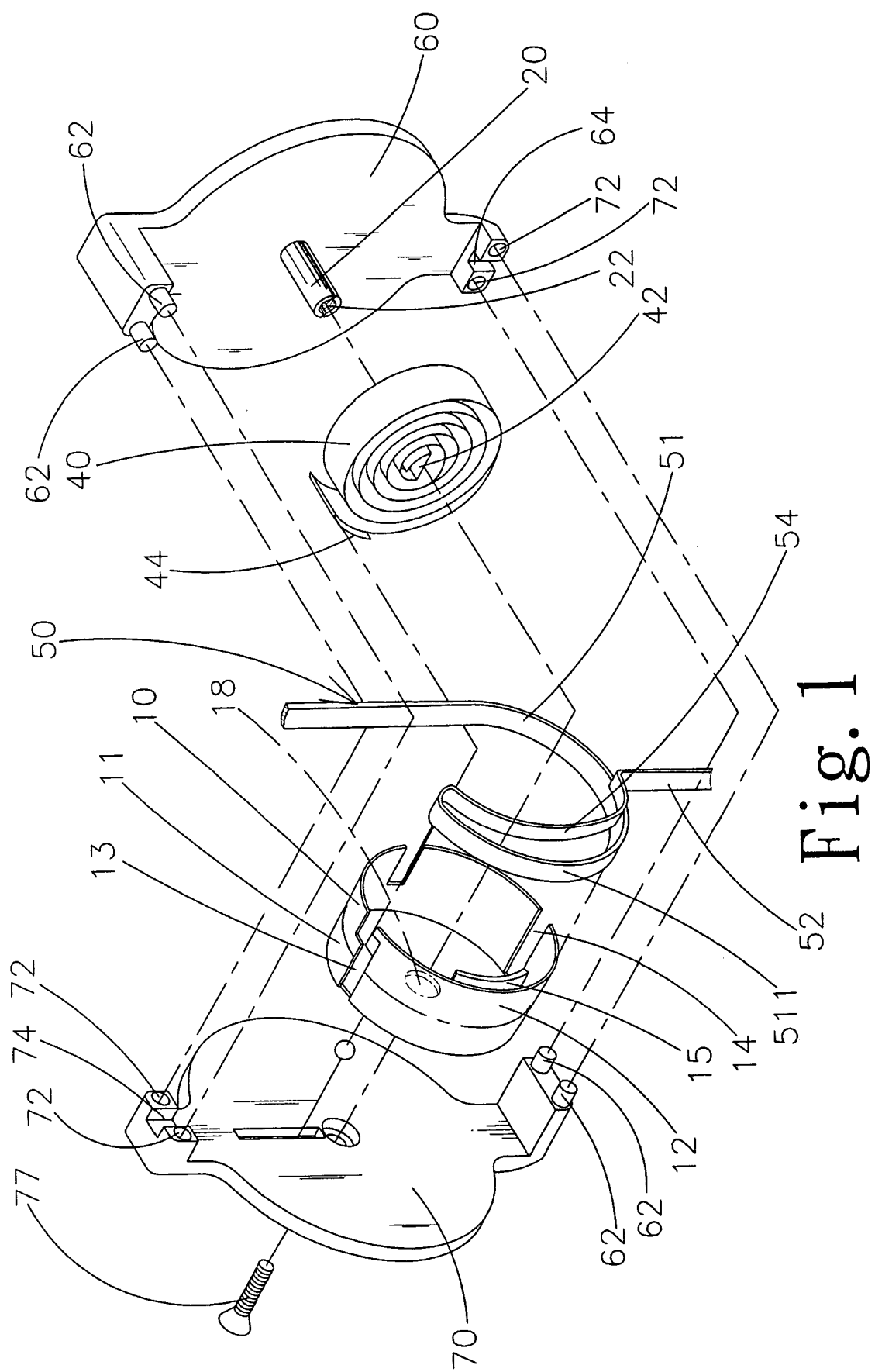
FIG. 1 shows an exploded elevational view according to the invention.

Referring to FIG. 1, a device according to the invention comprises:

a rotatable turning wheel 10 biased in a retraction direction, when accepting force, capable of forward and reverse elastic rotations relative to a fixed shaft 20 to which a center of the turning wheel 10 is flexibly connected; wherein the turning wheel 10 has wheel surfaces as a left wheel surface 11 and a right wheel surface 12, two transverse wedge apertures 13 and 14 disposed at the wheel surfaces, an encircling groove 15 formed at inner walls thereof, and a center opening 18 flexibly connecting the turning wheel 10 to the fixed shaft 20; and A continuously wire 50 with an appropriate section 54 thereof placed in 5 the encircling groove 15, having defined left and right wires 51 and 52 by guiding one end out to an exterior via the wedge aperture 13 and the other end via the other wedge aperture 14; wherein the left wire 51 is folded in a reverse direction at an exit of the wedge aperture 13 to wind at the left wheel surface 11, and the right wire 52 is wound on a forward direction at the right wheel surface 12.

Figure 2:
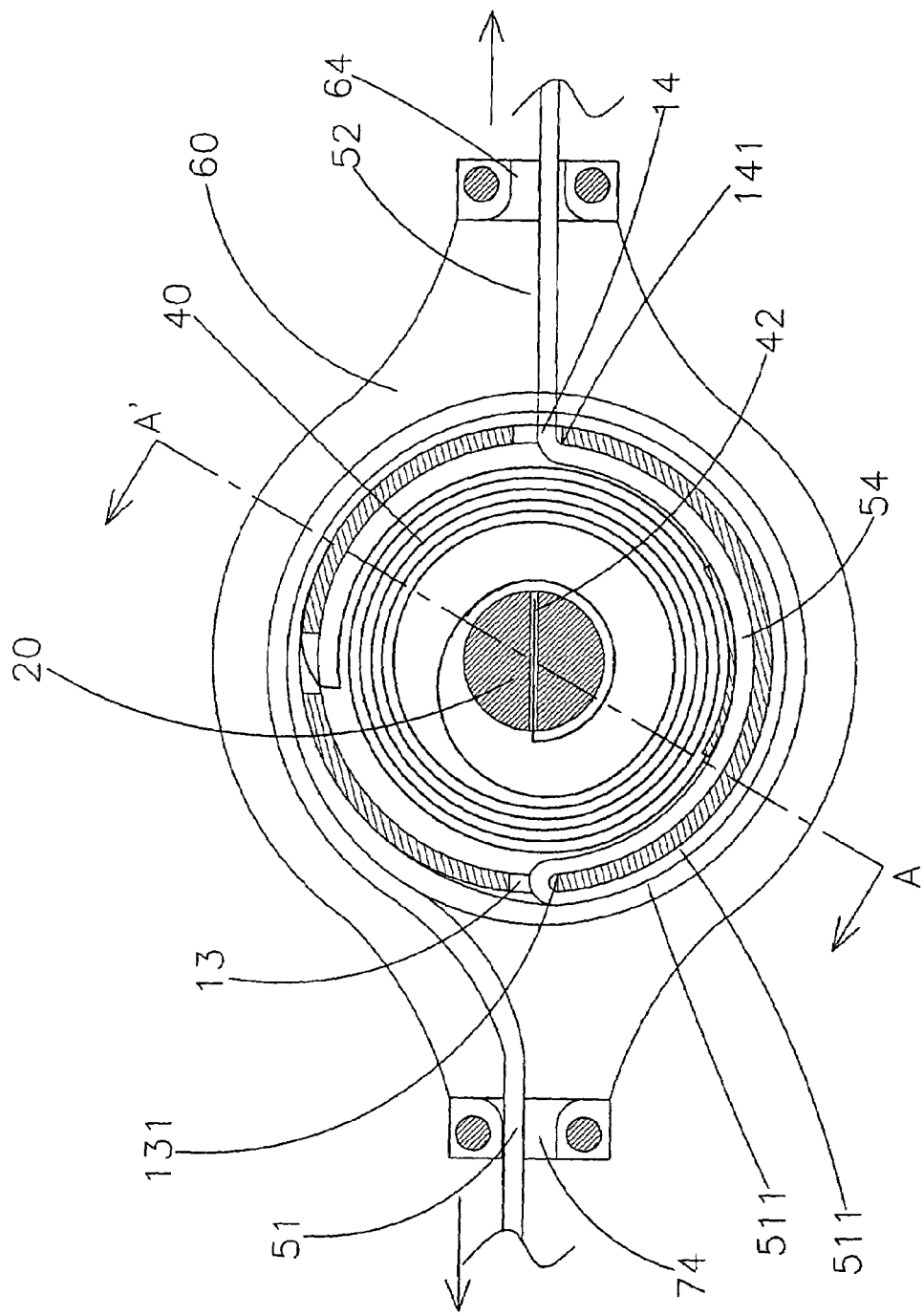
FIG. 2 shows a sectional schematic view illustrating the left and right wires being pulled to outer dead centers according to the invention.

The characteristics of the aforesaid structure are that, a number of rounds of the left wire 51 wound at the left wheel surface 11 is at least one more than that of the left wire 52 wound on the right wheel surface 12, and when the left and right wires 51 and 52 are released from the left and right wheel surfaces 11 and 12 to reach outer dead centers, at least one round of basic, coil 511 of the left wire 51 still binds tightly at the left wheel surface 11 but not released along as shown in FIG. 2.

According to the above structure, similarly, a number of rounds of the 20 right wire 52 wound on the right wheel surface 12 may selectively be at least one more than that of the left wire 51 wound on the left wheel surface 11. When the left and right wires 51 and 52 are released to having reached dead centers thereof, at feast one round of basic coil 521 of the right wire 52 still binds tightly at the right wheel surface 12 but not released.

EXAMPLE

1. Referring to FIG. 1, an inner side of the turning wheel 10 having a constant outer diameter is accommodated by a spring 40. The fixed shaft 20 is fastened at an inner surface of a right casing 60, and a left casing 70 is fastened to the fixed shaft 20 by screwing a screw bolt 77 into a screw opening 22 at an end portion of the fixed shaft 20. The left and right casings 70 and 60 are joined by inserting an insertion column 62 into an insertion opening 72, so as to construct a wire winding mechanism and form wire storage chambers at upper spaces of the left and right wheel surfaces 11 and 12. The spring 40 has an inner end 42 fixed to the fixed shaft 20, and an outer end 44 fixed to a wall surface of the turning wheel 10. Using the aforesaid structure, the turning wheel 10 becomes capable of elastically rotatable in both forward and reverse directions using the fixed shaft 20 as an axis of rotation. Referring to FIG. 2, the left wire 51 is guided out to an exterior via an upper guiding orifice 74, and the left wire 52 is guided out via a lower guiding orifice 64.

Figure 3:
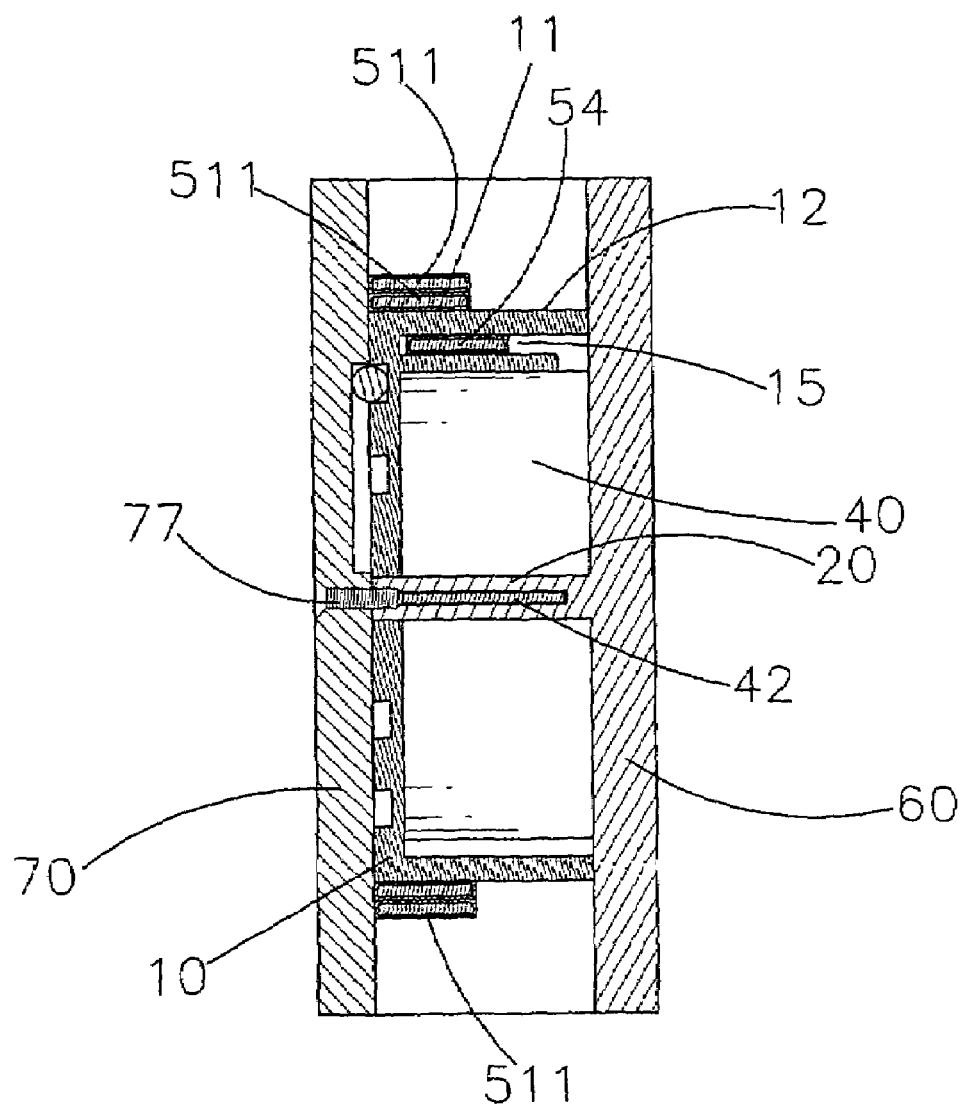
FIG. 3 shows a sectional view of FIG. 2 taken along A–A'.
Figure 4:
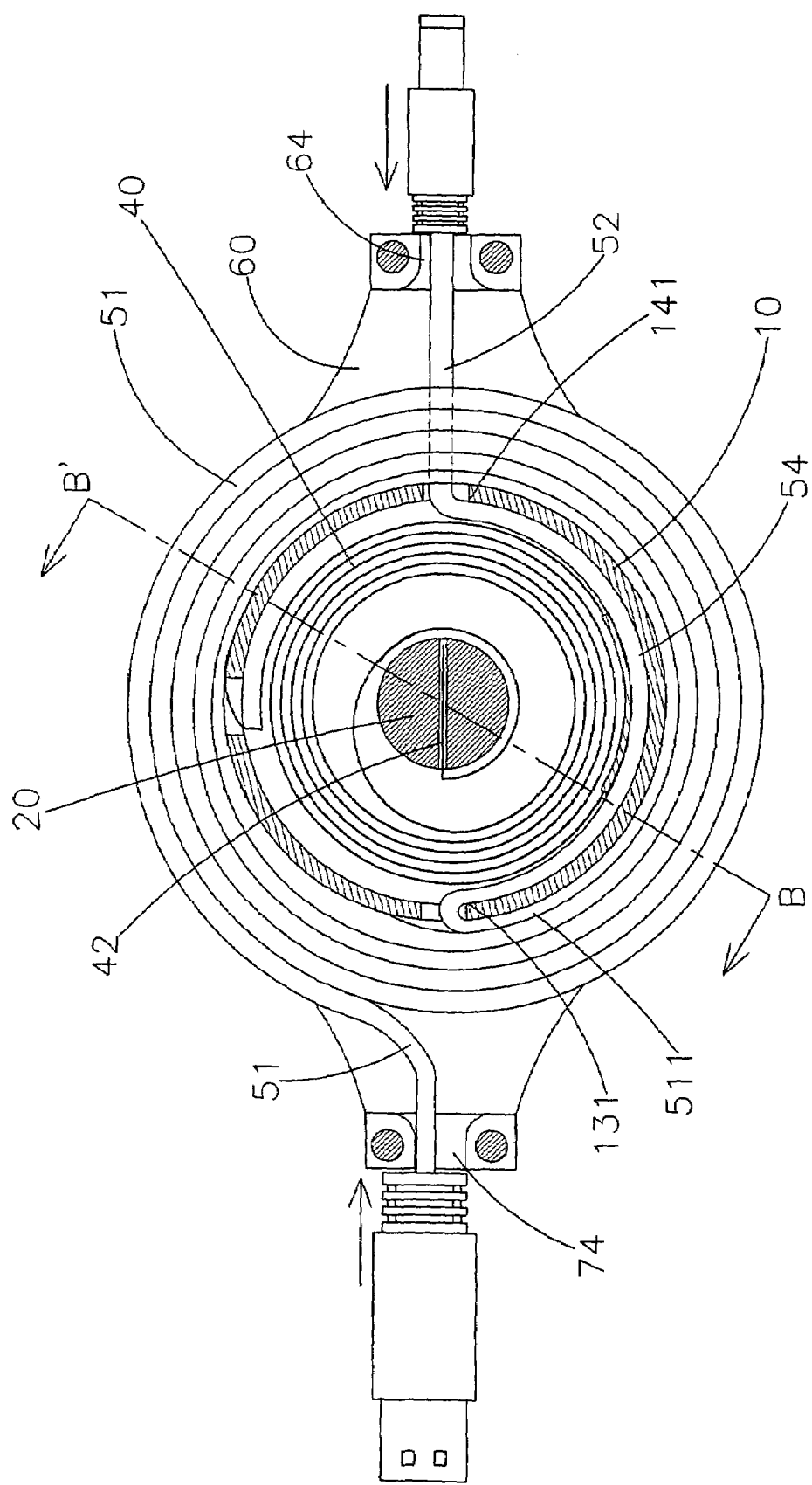
FIG. 4 shows a sectional view illustrating the left and right wires having been restored according to the invention.
Figure 5:
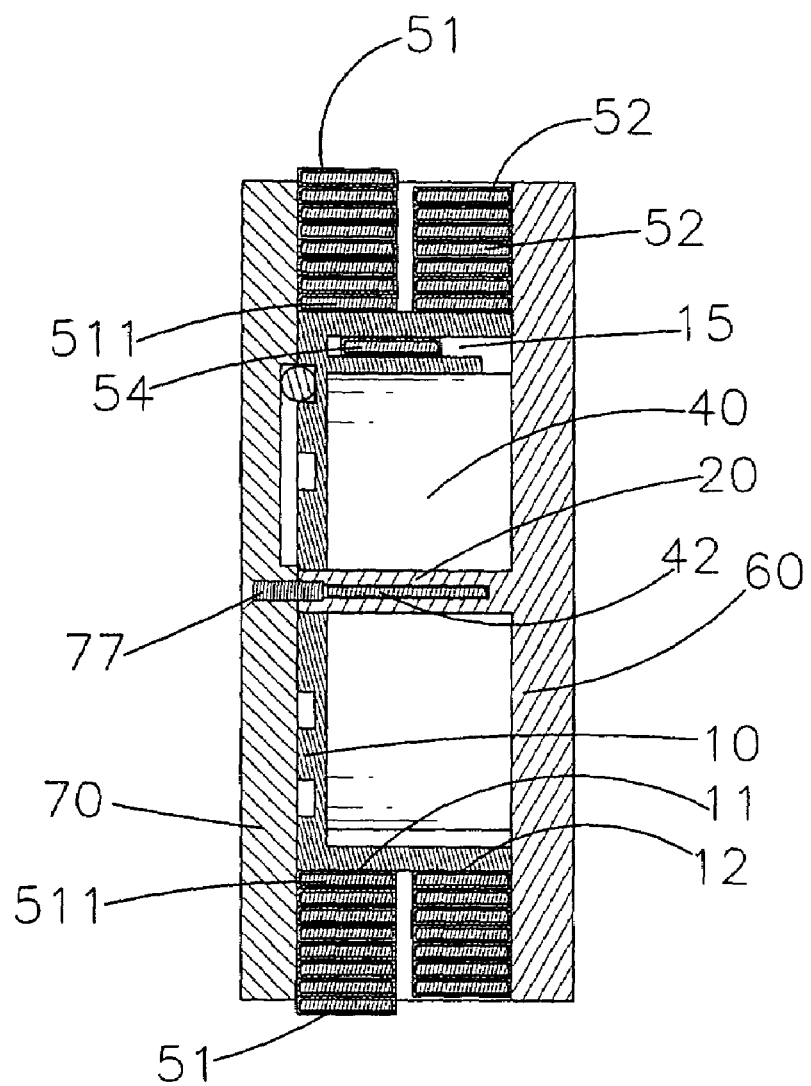
FIG. 5 shows a sectional view of FIG. 4 taken along B–B'.
Figure 6:
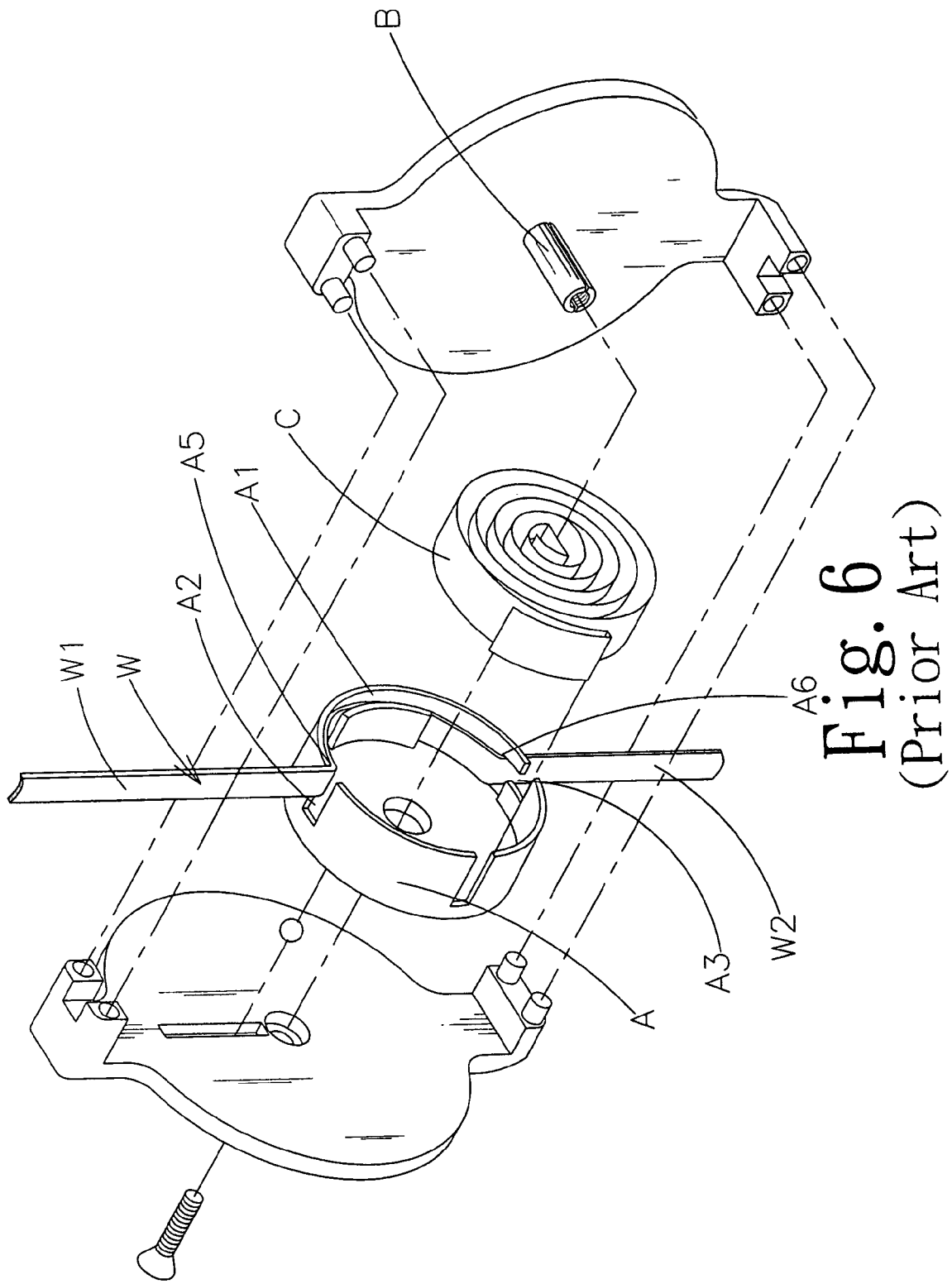
FIG. 6 shows a conventional exploded elevational view of a prior winding device.
Figure 7:
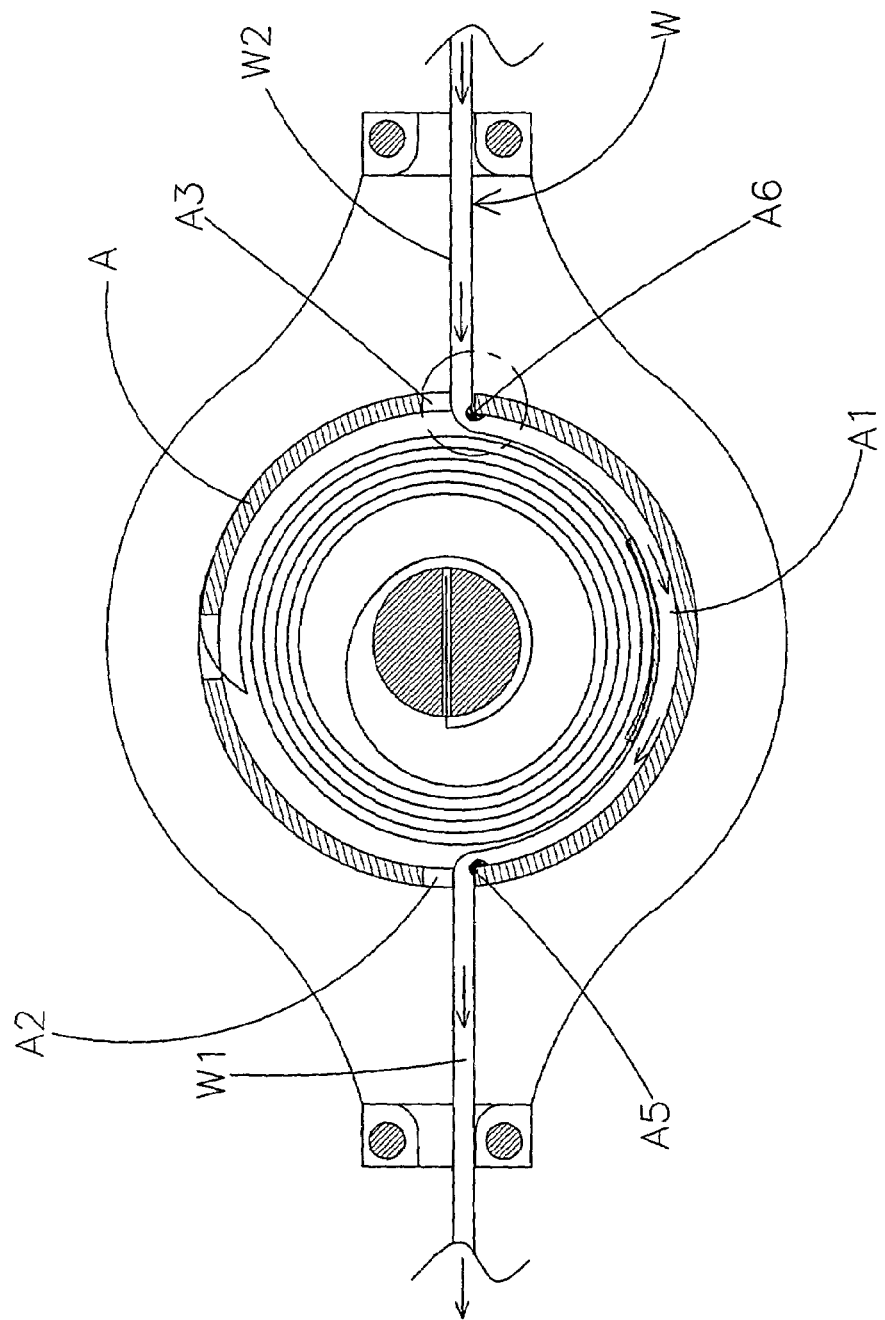
FIG. 7 shows a schematic view illustrating the left and right wires being pulled to outer dead centers of the prior art.
Figure 8:
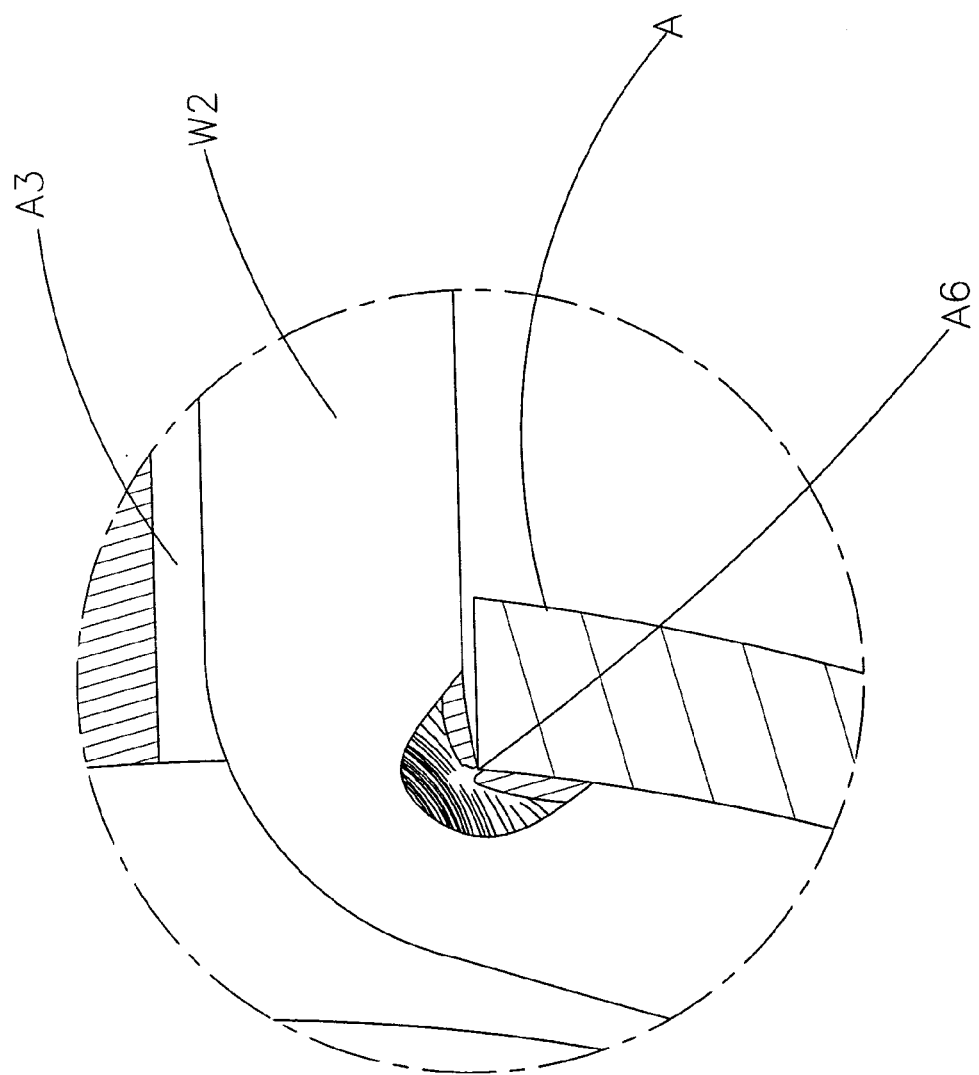
FIG. 8 shows an enlarged planar view illustrating the wire in the prior 10 art being abraded and damaged.

Referring to FIGS. 4 and 5, the left and right wires 51 and 2 are completed stored into the storage chambers at the left and right wheel surfaces 11 and 12 of the turning wheel 10. The characteristics of the invention are that, the left and right wires 51 and 52 wound on the left and right wheel surfaces 11 and 12 are different with respect to numbers of rounds wound. A number of rounds of the left wire 51 (or the right wire 52) wound on the left wheel surface 11 is at least one more than that of the right wire 52 (or the left wire 51) wound on the right wheel surface 12 (or the left wheel surface 11). When a user pulls the left and right wires 51 and 52 by applying an outward force, the turning wheel 10 rotates in the same direction relative to the fixed shaft 20 as an axis of rotation by means of torsional force. Referring to FIGS. 2 and 3, when the left and right wires 51 and 52 are released to extremities (the outer dead centers) thereof in reverse directions, at least one round of basic coil 511 of the left wire 51 still remains and tightly binds to the left wheel surface 11 (FIG. 2 shows two rounds of basic coil 511), so that torsional moments are evenly accepted by the basic coil 511, the left wheel surface 11 and the right wheel surface 12. Thus, stress is not concentrated at contact points 131 and 141 of the wedge apertures 13 and 14 and the left and right wires 51 and 52, and frictional force is minimized by avoiding substantial shear force at the contact points 131 and 141. In addition, surfaces of the left and right wires 51 and 52 are not damaged nor cracked from being abraded, and a section 54 of the wire placed in the encircling groove 15 is less likely to slide and be displaced within the encircling groove 15 from force, thereby preventing differences in lengths of the left and right wires 51 and 52 released from or stored on the surfaces of the turning wheel 10.

Conclusive from the above, according to the invention, the difference in the number of rounds of the left and right wires 51 and 52 wound on the left and right wheel surfaces 11 and 12 having equal outer diameters, is capable of increasing stability and reliability of the entire wire 50 whether being released or stored, thereby overcoming a drawback as damages and displacements of the wire 50.

It is of course to be understood that the embodiment described herein is merely illustrative of the principles of the invention and that a wide 20 variety of modifications thereto may be effected by persons skilled in the art without departing from the spirit and scope of the invention as set forth in the following claims.

What is claimed is:

1. A winding device of a winding wheel and a wire, comprising:

an elastically rotatable turning wheel capable of forward and reverse rotations biased in a retraction direction using a flexibly connected fixed shaft as an axis of rotation when accepting external forces; and having wheel surfaces defined as a left wheel surfaces and a right wheel surfaces, at least two transverse wedge apertures disposed at appropriate positions of the wheel surfaces, and an encircling groove formed at inner walls of the turning wheel; wherein, the turning wheel has a center opening thereof fastened around the fixed shaft; and a continuous wire having an appropriate section thereof placed in the encircling groove, one end thereof guided out from one of the wedge aperture and the other end thereof guided out from the other wedge aperture, thereby defining left and right wires; wherein, the left wire is folded in a reverse direction at an exit of the wedge apertures and wound on the left wheel surface, and the right wire is wound in a forward direction on the right wheel surface; and the characteristics thereof being that, a number of rounds of the left wire wound on the left wheel surface is at least one more than that of the right wire wound at the right wheel surface, such that when the left and right wires are withdrawn from the left and right wheel surfaces to their fully withdrawn lengths, at least one round of basic coil of the left wire tightly binds around the left wheel surfaces and remains unreleased.

2. A winding device of a winding wheel and a wire, comprising:

an elastically rotatable turning wheel capable of forward and reverse rotations biased in a retraction direction using a flexibly connected fixed shaft as an axis of rotation when accepting external forces; and having wheel surfaces defined as a left wheel surfaces and a right wheel surfaces, at least two transverse wedge apertures disposed at appropriate positions of the wheel surfaces, and an encircling groove formed at inner walls of the turning wheel; wherein, the turning wheel has a center opening thereof fastened around the fixed shaft; and a continuous wire having an appropriate section thereof placed in the encircling groove, one end thereof guided out from one of the wedge aperture and the other end thereof guided out from the other wedge aperture, thereby defining left and right wires; wherein, the left wire is folded in a reverse direction at an exit of the wedge apertures and wound on the left wheel surface, and the right wire is wound in a forward direction on the right wheel surface; and the characteristics thereof being that, a number of rounds of the right wire wound on the right wheel surface is at least one more than that of the left wire wound at the left wheel surface, such that when the left and right wires are withdrawn from the left and right wheel surfaces to their fully withdrawn lengths, at least one round of basic coil of the right wire tightly binds around the right wheel surfaces and remains unreleased.

* * * * *